Figure 1:
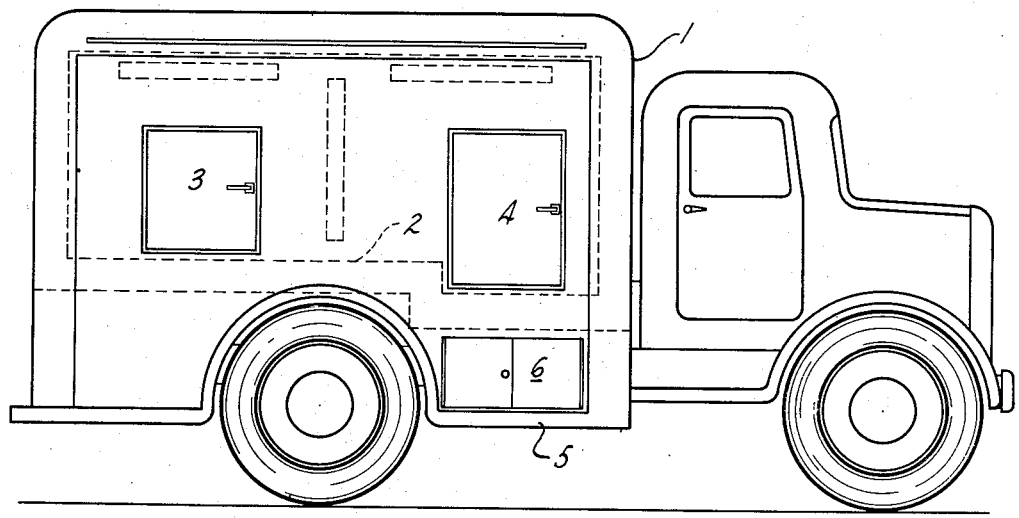

Dec. 22, 1953  R. P. MANSMANN  2,663,163
REFRIGERATED TRUCK BODY
Filed May 17, 1952

INVENTOR.
Raymond P. Mansmann
BY William B. Jaspert
attorney.

Patented Dec. 22, 1953

2,663,163

UNITED STATES PATENT OFFICE 2,663,163

REFRIGERATED TRUCK BODY

Raymond P. Mansmann, Pittsburgh, Pa.

Application May 17, 1952, Serial No. 288,430

1 Claim. (Cl. 62—117)

This invention relates to new and useful improvements in refrigerated truck bodies, more particularly to the provision of special means for arranging and mounting a condenser unit in relation to a specially located exhaust passage and the useful areas of the truck body.

It is among the objects of the invention to provide a refrigerated truck body in which the refrigerator condenser unit is mounted in an especially constructed compressor compartment below the floor of the body with an exhaust passage to the rear of the body to provide greater capacity to the condenser unit with freedom from contamination from dirt and without obstruction.

The invention will become more apparent from a consideration of the accompanying drawing, constituting a part hereof, in which like reference characters designate like parts, and in which—

Fig. 1 is a side elevational view of a refrigerated truck body; and

Figure 2:
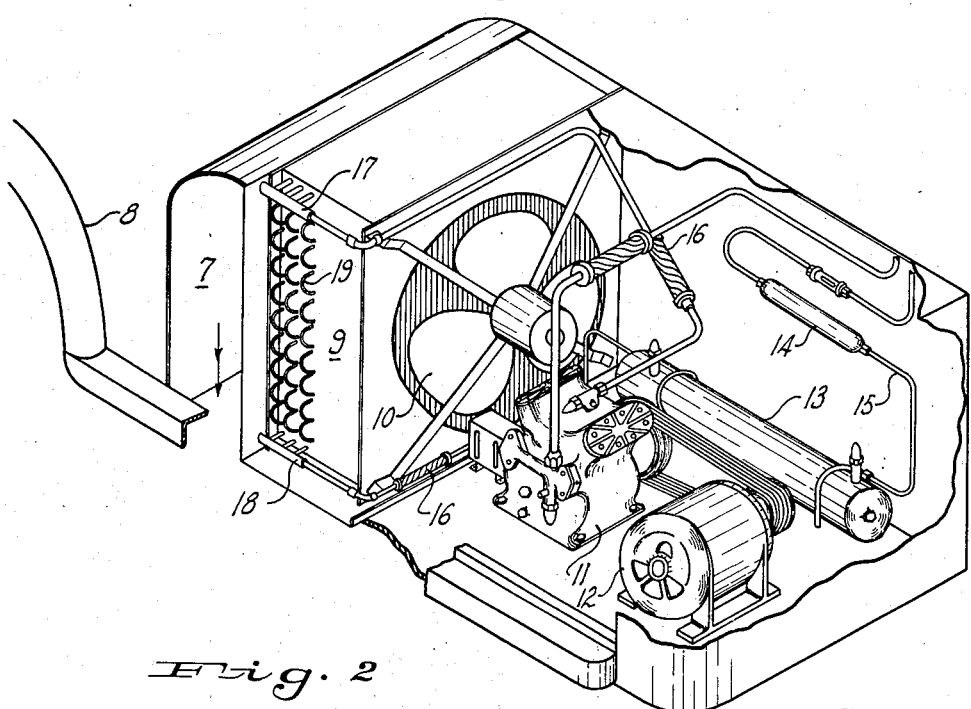

Fig. 2 a view in perspective of a low temperature condensing unit mounted in the truck of Fig. 1, and embodying the principles of this invention.

In the drawing the numeral 1 generally designates the truck body in which the dash line 2 designates the floor. Doors 3 and 4 are provided for accessibility to the refrigerated compartment of the body, and a depending extension 5 of the body constitutes a housing for a compressor compartment as shown in Figure 2 of the drawing. Doors 6 are provided for the compressor compartment to render it conveniently accessible from the outside of the truck.

With reference to Figure 2 of the drawing, it will be noted that the compressor compartment is provided with an exhaust passage 7 inside of the fender 8 of the rear wheels. A condenser designated by the numeral 9 is placed in front of the exhaust passage 7 and a blower fan 10 drives air from the compressor compartment through the condenser to the exhaust passage 7 from which it passes downward beneath the truck.

Located within the compressor compartment is a compressor 11, a motor 12, a receiver 13 and a drier 14, the compressor, receiver and drier being interconnected by tubing or conduits generally designated by the numeral 15 having vibration eliminator connections 16 to prevent breakage due to the hard usage such equipment is subjected to when mounted in trucks. The compressor and its auxiliary equipment is appropriately connected to the condenser manifolds 17 and 18 to circulate the refrigeration medium through the condenser cells 19.

Suitable electrical connections for the motor 12, not shown, are provided for driving the compressor unit when the refrigerating trucks are parked overnight so that load space temperatures may be reduced and maintained through the temperature reduction in the holdover space designated by numeral 2 in Fig. 1.

By means of the arrangement shown in Figure 2 of the drawing, the need for extending the compressor compartment into the floor of the body is eliminated, thus providing greater loading space and ease of handling the products.

Accessibility of the compressor unit is also an important factor which is accomplished by means of the location of that unit where outside doors may be provided as shown. The arrangement of the condenser and compressor chamber outside of the load space of the truck body is accomplished by arranging the component parts of the condensing unit in logical locations within the compressor compartment. The location of the condenser outside of the load space of the truck body permits air to pass freely from doors 6 through the compressor chamber without obstruction as exists in units in conventional use.

By locating the condenser at the rear of the compressor chamber, an unobstructed passage of air through the exhaust passage 7 is provided and no dirt will enter the compartment when the vehicle is on the road. By reason of the greater air flow over the condenser made possible by the within described and illustrated refrigeration installation, head pressure in the refrigerating system is reduced, thus allowing much greater operating efficiency.

Although one embodiment of the invention has been herein illustrated and described, it will be evident to those skilled in the art that various modifications may be made in the details of construction without departing from the principles herein set forth.

I claim:

In a refrigerator truck body, a compressor compartment located below the floor of the truck at the front thereof and forming a part of the truck body, said compartment having side doors on the outside of the body and having an open exhaust passage coextensive with the width of the compartment extending downward below the truck body at the rear of the compartment, a condenser disposed adjacent said exhaust passage and a blower and compressor with accessories in spaced relation in front of said condenser to maintain an unobstructed flow of air from the door opening of said compartment through said condenser to the exhaust passage of the compartment.

RAYMOND P. MANSMANN.

References Cited in the file of this patent

UNITED STATES PATENTS

| Number | Name | Date |
|---|---|---|
| 2,479,170 | Kuempel | Aug. 16, 1949 |
| 2,541,921 | Henny | Feb. 13, 1951 |
| 2,571,445 | Hawkes | Oct. 16, 1951 |